United States Patent
Nowottnick

(10) Patent No.: US 9,069,959 B2
(45) Date of Patent: Jun. 30, 2015

(54) CRYPTOGRAPHIC CIRCUIT PROTECTION FROM DIFFERENTIAL POWER ANALYSIS

(71) Applicant: NXP B.V., Eindhoven (NL)

(72) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 161 days.

(21) Appl. No.: 13/725,377

(22) Filed: Dec. 21, 2012

(65) Prior Publication Data

US 2014/0181534 A1 Jun. 26, 2014

(51) Int. Cl.
G06F 21/55 (2013.01)
G06F 21/72 (2013.01)
G06F 21/87 (2013.01)
G06F 21/76 (2013.01)
G06F 21/75 (2013.01)

(52) U.S. Cl.
CPC ............. *G06F 21/558* (2013.01); *G06F 21/72* (2013.01); *G06F 21/87* (2013.01); *G06F 21/76* (2013.01); *G06F 21/55* (2013.01); *G06F 21/75* (2013.01)

(58) Field of Classification Search
None
See application file for complete search history.

(56) References Cited

U.S. PATENT DOCUMENTS

| 4,730,496 | A | 3/1988 | Knecht et al. | |
| 7,380,150 | B2 * | 5/2008 | Meier et al. | 713/340 |
| 8,525,545 | B1 * | 9/2013 | May et al. | 326/8 |
| 8,624,624 | B1 * | 1/2014 | May et al. | 326/9 |
| 8,635,467 | B2 * | 1/2014 | Gunnam et al. | 713/194 |
| 2009/0136035 | A1 * | 5/2009 | Lee | 380/270 |
| 2010/0154553 | A1 | 6/2010 | Phan Le et al. | |
| 2010/0194205 | A1 | 8/2010 | Tokunaga et al. | |
| 2011/0102164 | A1 * | 5/2011 | Ghabra | 340/426.13 |
| 2012/0210138 | A1 | 8/2012 | Tucker | |

FOREIGN PATENT DOCUMENTS

| CN | 87104354 A | 1/1988 |
| CN | 2210389 Y | 10/1995 |
| CN | 101711348 A | 5/2010 |
| CN | 202153165 U | 2/2012 |
| EP | 1 107 191 A1 | 6/2001 |
| EP | 2 587 469 A1 | 5/2013 |
| JP | 4542397 B2 | 9/2010 |
| WO | 9405988 A1 | 3/1994 |
| WO | 2008/019246 A2 | 2/2008 |

OTHER PUBLICATIONS

"Smart key"opedia, 4 pgs., retrieved from the Internet Mar. 17, 2014 at : http://en.wikipedia.org/w/index.php?title=Smart_key&direction=next&oldid=516750902 (Oct. 20, 2012).

(Continued)

*Primary Examiner* — Kaveh Abrishamkar
*Assistant Examiner* — Tri Tran

(57) ABSTRACT

According to an example embodiment, a device provides cryptographic processing functions using secret data. The device can include protection from differential power analysis (DPA). The encryption processing circuit and its memory can be decoupled from external power source(s) during encryption-related computations. A local power storage element, such as a capacitive element, can provide power while the encryption processing circuit is decoupled from the external power source(s). The local power storage element can then be reconnected and charged once the encryption-related computations are completed or paused.

16 Claims, 4 Drawing Sheets

(56) References Cited

OTHER PUBLICATIONS

"BMW Keys—Mercedes Keys—Alfa Romeo Keys—Fiat Keys—Car Key Repair Specialists—Automotive Locksmith—Auto Electronic Specialists—Auto Electrical—Auto Mechanical—Auto Diagnostics in Auckland—Automotive Servicing—Air Conditioning—GT Mechtronix Ltd", 6 pgs., retrieved from the Internet Mar. 17, 2014 at: http://gtmechtronix.co.nz/imagesjkey programming repairs.jpg—Retrieved from the Internet: URL:http:jjweb.archive.orgjweb/20120410051612/http://www.gtmechtronix.co.nz;index.php?content=carkeyrepairs (Apr. 10, 2012).

Extended European Search Report for European Patent Appln. No. 13198109.4 (Mar. 27, 2014).

* cited by examiner

CRYPTOGRAPHIC CIRCUIT PROTECTION FROM DIFFERENTIAL POWER ANALYSIS

Aspects of the present disclosure relate to apparatuses, devices, and methods involving cryptographic circuits, and more particularly, to providing protection from power-sensing attacks upon the cryptographic circuit.

Systems that make use of cryptographic protocols are vulnerable to implementation attacks especially where an attacker has physical access to a targeted device. With physical access to the targeted device, an attacker can monitor or modify the device in order to recover sensitive information. This can include obtaining a hidden key used for encryption. For instance, physical access to a device allows an individual to detect data that can be used to significantly reduce the strength of the encryption algorithm. This use of detected data is sometimes referred to as a side-channel attack. A particular type of side-channel attack is differential power analysis/attacks (DPA). The side-channel information for DPA is based on the power consumption of the encryption processing circuit.

For instance, power consumption data from the encryption processing circuit allows an attacker to make reasonable assumptions regarding the encryption algorithm as it is being processed. The power consumption data can be used to statistically determine, or at least make a reasonable guess, as to the exact key being used for encryption. This is particularly true when the encryption protocol is known to, or can be guessed by, the attacker. DPA attacks can use signal processing and error correction properties. Using DPA, an adversary can obtain secret keys by analyzing power consumption measurements from multiple cryptographic operations performed by a vulnerable smart card or other device.

Aspects of the present disclosure are directed to approaches to systems and methods useful for thwarting side channel attacks on encryption algorithms. The present disclosure is exemplified in a number of implementations and applications including those presented below, which are commensurate with certain claims included with this patent document.

Certain embodiments are directed toward a device that has an integrated circuit (IC) die that is configured to provide cryptographic functions. The IC die can include a cryptographic processing circuit that is configured and arranged to execute a cryptographic algorithm that causes a detectable change in power consumption by the cryptographic processing circuit. This detectable change can be used to obtain information about the cryptographic algorithm. For instance, the detectable change can be used to infer characteristics of a secret key used during the execution of the cryptographic algorithm. A power storage circuit is configured and arranged to store power sufficient for the cryptographic processing circuit to execute the cryptographic algorithm. An encapsulation structure is designed to encapsulate the cryptographic processing circuit and the power storage circuit. The encapsulation structure is configured and arranged to prevent physical tampering. This can include, for instance, protective measures that disable the cryptographic processing circuit if the encapsulation is removed or broken. A control circuit is configured and arranged to charge the power storage circuit by providing power from an external power source. The control circuit is also configured and arranged to disable, in response to the cryptographic processing circuit executing the cryptographic algorithm, the charging of the power storage circuit using the power from the external power source.

Consistent with various embodiments, a device includes an IC die having a cryptographic processing circuit that is configured and arranged to execute a cryptographic algorithm that is subject to side channel attacks that use power consumption of the cryptographic processing circuit. A power storage circuit is configured and arranged to store power sufficient for the cryptographic processing circuit to execute the cryptographic algorithm. An encapsulation structure encapsulates the cryptographic processing circuit and the power storage circuit and that is configured and arranged to prevent physical tampering therewith. A first electrical connection port is provided for external connection relative to the IC die. A switching control circuit is configured and arranged to operate in each of two alternative modes. A first mode charges the power storage circuit using power provided from an external power source. A second mode acts to block the power provided from the external power source and to provide power from the power storage circuit to the cryptographic processing circuit. The switching control circuit is configured and arranged to determine a condition prompting execution of the algorithm and in response to the determination, select between the two alternative modes. A second electrical connection port is provided for external connection between the switching control circuit and electrical connection port of the integrated circuit die.

Certain embodiments are directed toward a method that includes the execution, using a cryptographic processing circuit, of a cryptographic algorithm that causes a detectable change in power consumption by the cryptographic processing circuit. Power is stored in a power storage circuit. The amount of stored power is sufficient for the cryptographic processing circuit to execute the cryptographic algorithm. A switching circuit is controlled in order to charge the power storage circuit by providing power from an external power source, and to disable, in response to the cryptographic processing circuit executing the cryptographic algorithm, the charging of the power storage circuit using the power from the external power source.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
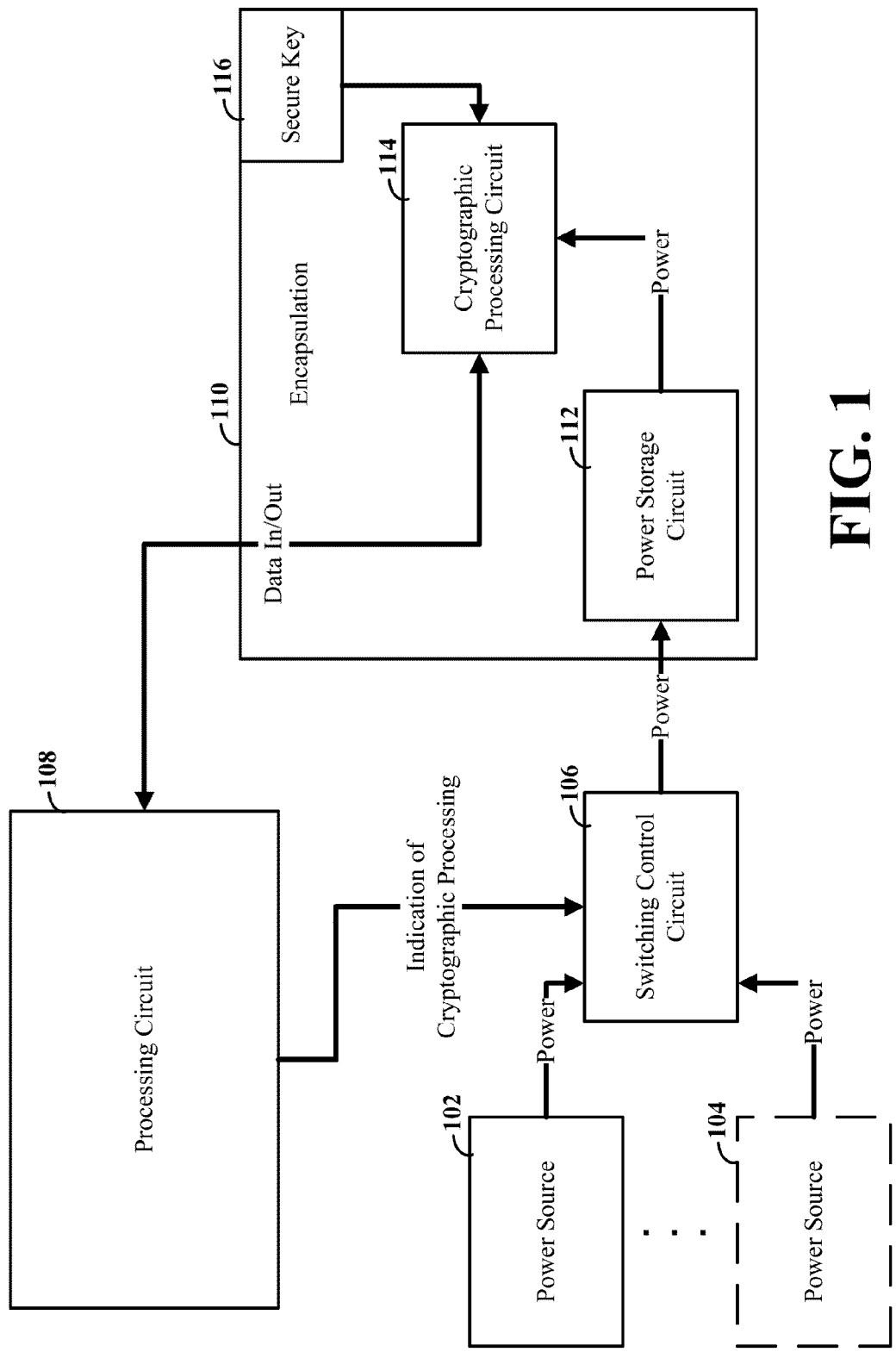
FIG. 1 depicts a block diagram of a system and device for providing cryptographic processing, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving cryptographic processing and protection from side channel attacks. While not necessarily so limited, various aspects may be appreciated through a discussion of examples using this context.

Embodiments of the present disclosure are directed toward a device that provides cryptographic processing functions using secret data, such as a private encryption key. The secret data can be stored in a location that is protected from external attempts at accessing the data. This protection can include, for example, physical tamper resistant encapsulation of an encryption processing circuit and memory. The device can include further protection of the secret data relative to attempts at monitoring the power consumption of the encryption processing circuit and memory. This can be particularly useful for counteracting attacks that use differential power analysis (DPA) in order to infer information about the secret data or key. Particular embodiments decouple the encryption processing circuit and memory from external power source(s) during encryption-related computations. A local power storage element, such as a capacitive element, can provide power while decoupled from the external power source(s). The local power storage element can then be reconnected and charged once the encryption-related computations are completed or paused.

Certain embodiments are directed toward a device that has an integrated circuit (IC) die configured to provide cryptographic functions. The IC die can include a cryptographic processing circuit that is configured and arranged to execute a cryptographic algorithm that causes a detectable change in power consumption by the cryptographic processing circuit. This detectable change can be used to obtain information about the cryptographic algorithm. For instance, the detectable change can be used to infer characteristics of a secret key used during the execution of the cryptographic algorithm. A power storage circuit is configured and arranged to store power sufficient for the cryptographic processing circuit to execute the cryptographic algorithm. An encapsulation structure encapsulates the cryptographic processing circuit and the power storage circuit. The encapsulation structure is configured and arranged to prevent physical tampering. This can include, for instance, protective measures that disable the cryptographic processing circuit if the encapsulation is removed or broken. A control circuit is configured and arranged to charge the power storage circuit by providing power from an external power source. The control circuit is also configured and arranged to disable, in response to the cryptographic processing circuit executing the cryptographic algorithm, the charging of the power storage circuit using the power from the external power source.

Consistent with various embodiments, a device includes an IC die having a cryptographic processing circuit that is configured and arranged to execute a cryptographic algorithm that is subject to side channel attacks that use power consumption of the cryptographic processing circuit. A power storage circuit is configured and arranged to store power sufficient for the cryptographic processing circuit to execute the cryptographic algorithm. An encapsulation structure encapsulates the cryptographic processing circuit and the power storage circuit and is configured and arranged to prevent physical tampering therewith. A first electrical connection port is provided for external connection relative to the IC die. A switching control circuit is configured and arranged to operate in each of two alternative modes. A first mode charges the power storage circuit using power provided from an external power source. A second mode acts to block the power provided from the external power source and to provide power from the power storage circuit to the cryptographic processing circuit. The switching control circuit is configured and arranged to determine a condition prompting execution of the algorithm and in response to the determination, select between the two alternative modes. A second electrical connection port is provided for external connection between the switching control circuit and electrical connection port of the integrated circuit die.

Particular embodiments of the present disclosure are directed toward routing of power-providing electrical traces underneath an inductive (antenna) coil. This can be particularly useful for inhibiting detection of electromagnetic field changes caused by power consumption from the cryptographic processing circuit. One or more electrical vias can be used to connect an external power source to the electrical traces, which can be located in an intermediate layer of a printed circuit board (PCB) or substrate.

Consistent with one or more embodiments, an inductive coil can receive power from received radio frequency (RF) signals and to provide the received power to the control circuit. In certain embodiments, power can be provided from a battery or external input.

As discussed herein, the power storage circuit can be constructed using a capacitive circuit with one or more capacitors. The power storage circuit can be constructed with enough capacitance to store power sufficient for the cryptographic processing circuit to execute the cryptographic algorithm. This can be adjusted as a function of voltage level of the input power and/or the particulars of the cryptographic algorithm and cryptographic processing circuit. For instance, the power storage circuit can be designed to compensate for worst case conditions (e.g., relative to power consumption and voltage from the external power supply).

A few example cryptographic algorithms include, but are not limited to, DES, triple DES, AES and RSA. These and other cryptographic algorithms can use a private key to generate a security code that can be communicated to by a remote system. The remote system is then able to verify the security code. For instance, the cryptographic device can be used to provide a security code to an automobile (keyless) entry system. Such a device can function as an automotive key that includes a transponder configured and arranged to wirelessly communicate with an associated vehicle. The embodiments function as a passive-keyless-entry (PKE) device powered by a battery located on a substrate that supports the integrated circuit die and the control circuit.

Certain embodiments of the present disclosure relate to more complex control over switching circuitry connecting the external power supply to the local power storage circuit. For instance, the power storage circuit may not contain sufficient energy to complete an entire cryptographic function. Accordingly, the control circuit can be configured and arranged to reconnect the local power storage circuit to the external power supply during a cryptographic function. In certain instances, the cryptographic processing circuit can be paused while the power storage circuit is charged. In this manner, the power drawn from the external power supply is a function of the capacitance of the local power storage circuit. Accordingly, the power draw is not directly correlated to the cryptographic processing functions.

Turning now to the figures, FIG. 1 depicts a block diagram of a system and device for providing cryptographic processing, consistent with embodiments of the present disclosure. Cryptographic processing circuit 114 can be configured and arranged to provide encryption functions for various security applications. This can include receiving an input value and then encrypting the input value using secure key 116 (e.g., using Data Encryption Standard (DES), triple DES, Advanced Encryption Standard (AES), Rivest, Shamir, and Adleman (RSA) and elliptic curve cryptography (ECC)). The resulting encrypted value can then be provided as an output.

In certain embodiments, a processing circuit 108 can be configured and arranged to interface with cryptographic processing circuit 114. Processing circuit 108 can provide various functions tailored to the particular application. This separation of processing functions can be particularly useful when the cryptographic processing circuit 114 is encapsulated (110) to protect from physical tampering. Processing circuit 108 can be denied access to the secure key 116, and therefore, can be located outside of the encapsulation 110.

Side channel attacks can take advantage of detectable parameters to infer information about the secure key 116. The information can reduce the effectiveness of the encryption and allow an attacker to more easily determine the secure key 116. A particular detectable parameter is the amount of power drawn by cryptographic processing circuit 114. Accordingly, power storage circuit 112 can used to power the cryptographic processing circuit 114. Switching control circuit 106 can disconnect the cryptographic processing circuit 114 from external power sources 102-104 during cryptographic processing. Accordingly, an attacker can be prevented from seeing any power drawn from the external power sources 102-104 while the cryptographic processing circuit 114 is active.

Consistent with embodiments of the present disclosure, processing circuit 108 can provide an indication that cryptographic functions are to be carried out. In response, switching control circuit 106 can disconnect the cryptographic processing circuit 114 from external power sources 102-104. Processing circuit 108 can provide an indication that the cryptographic functions are completed. In response, switching control circuit 106 can reconnect the cryptographic processing circuit 114 to external power sources 102-104 and thereby charge the power storage circuit 112.

Although power will be drawn from external power sources 102-104, the power will be used to charge power storage circuit 112. This can effectively decouple (in time) the power drawn by the device from the actual processing algorithm carried out by the cryptographic processing circuit 114.

Consistent with certain embodiments, the power storing capabilities of the power storage circuit 112 can be set to sufficiently allow an entire encryption algorithm/function to be completed before recharging is required. This can be determined as a function of the power drawn by the cryptographic processing circuit 114, the length of time required to complete the entire encryption algorithm/function and/or the voltage level of the input supply.

Consistent with embodiments of the present disclosure, the cryptographic processing circuit 114 can include one or more voltage regulator circuits. The use of a voltage regulator circuit can be particularly useful where the power storage circuit 112 is a capacitive circuit that provides a changing/reduced voltage level as power is drawn by the cryptographic processing circuit 114. The voltage regulator circuit can be configured to provide a (relatively) stable voltage to the cryptographic processing circuit 114 over a wide range of input voltages. This can help to increase the amount of energy that can be recovered from a capacitive circuit (e.g., by allowing the capacitor to be charged to a higher voltage level and/or discharged to a lower voltage level).

Figure 2:
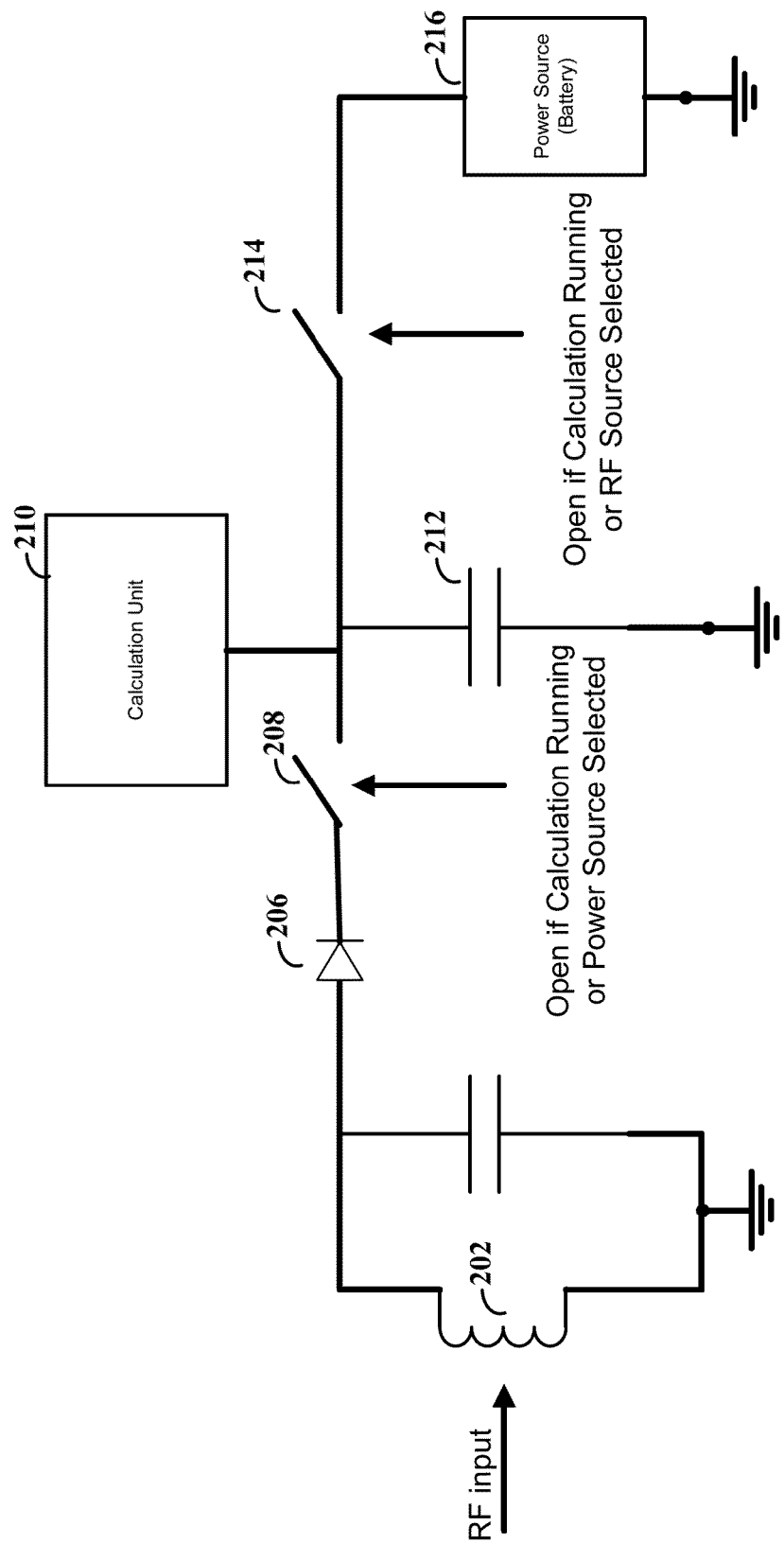
FIG. 2 depicts a circuit diagram of a device for providing cryptographic processing, consistent with embodiments of the present disclosure.

FIG. 2 depicts a circuit diagram of a device for providing cryptographic processing, consistent with embodiments of the present disclosure. Calculation unit/module 210 can be configured and arranged to provide cryptographic processing functions, such as DES, triple DES, AES, RSA or ECC. These example cryptographic processing functions are not meant to be limiting. Switches 208 and 214 selectively couple the calculation unit/module 210 to external power sources 202 and 216, respectively. Control signal(s) can be used to ensure that both switches 208 and 214 are open whenever the calculation unit/module 210 is actively processing a cryptographic function. When both switches 208 and 214 are open, calculation unit/module 210 draws its power from capacitive circuit 212.

Switches 208 and 214 can be selectively closed when calculation unit/module 210 is not processing a cryptographic function and when their respective power source (202 or 216) is selected for use. When closed, the respective power source charges the capacitive circuit 212. This charging of capacitive circuit 212 can therefore be accomplished substantially independent from the processing performed by calculation unit/module 210. This includes charging both following an RC-type curve and being disparate in time, relative to when the processing of the calculation unit/module 210 takes place. Such independence can be particularly useful for thwarting DPA attacks.

Figure 3:
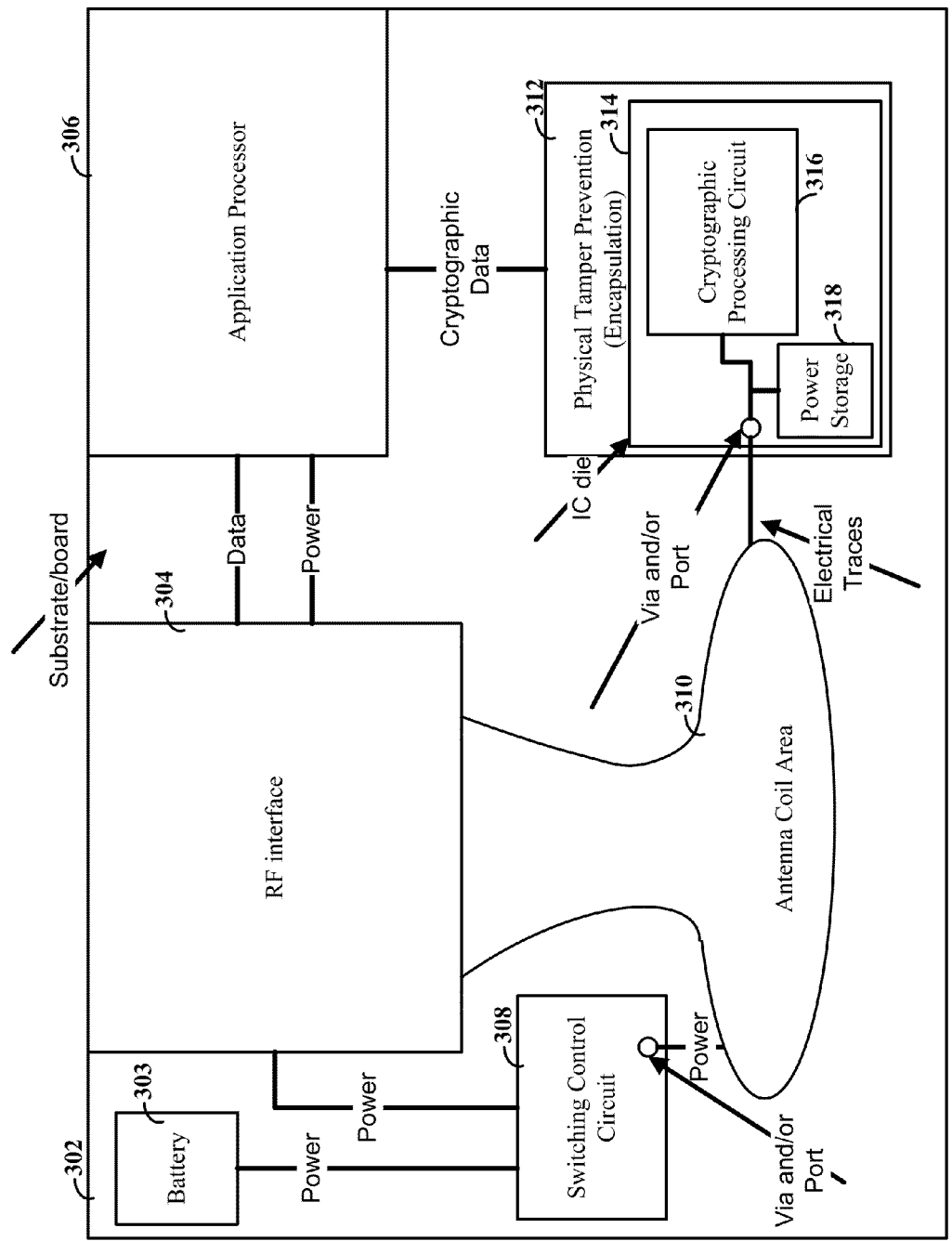
FIG. 3 depicts a diagram that includes trace routing, consistent with embodiments of the present disclosure.

FIG. 3 depicts a diagram that includes trace routing, consistent with embodiments of the present disclosure. The device depicted in FIG. 3 includes a number of components or modules that can be located on a common substrate or printed circuit board (PCB) 302. One such component is a radio frequency (RF) interface circuit 304. RF interface circuit 304 provides signal processing for wireless communications received (or transmitted) by antenna/coil 310. Application processor 306 can receive data from and provide data to the RF interface circuit 304.

For instance, certain embodiments relate to a wireless key for automobiles. The application's processor can transmit and receive data over the RF interface circuit 304 to communicate with a transceiver in an automobile. A security circuit in the automobile can require a confirmation that the key is authentic and for the proper automobile. Application processor 306 can provide this confirmation using security data received from cryptographic processing circuit 316. Cryptographic processing circuit 316 can generate the security data using a locally-stored private key and a particular encryption algorithm. Maintaining the secrecy of the private key can be accomplished using physical tamper protection 312 (e.g., encapsulating the IC die 314 and the cryptographic processing circuit 316). In certain embodiments, a local power storage circuit 318 (e.g., a capacitive circuit) can also be protected from physical tampering.

Power can be provided from a battery 303 and/or from the RF interface circuit 304. External sources of power are also possible. Switch control circuit 308 can connect either source of power to the local power storage circuit 318 to allow charging thereof. When cryptographic processing circuit 316 is actively processing, however, switch control circuit 308 can disconnect both sources of power, and thereby power the cryptographic processing circuit 316 from the local power storage circuit 318.

Embodiments of the present disclosure provide additional security by selective routing traces that connect switch control circuit 308 to the local power storage circuit 318. The selective routing of the traces can make monitoring of power difficult for a potential attacker. This can include, for example, routing the traces on an internal layer of the substrate or PCB 302. Moreover, the electrical traces can be routed underneath the antenna/coil 310. This can be particularly useful for masking electromagnetic signals originating from the electrical traces. Accordingly, the selective trace routing can inhibit detection of electromagnetic field changes caused by power consumption from the cryptographic processing circuit 316. Consistent with certain embodiments, the vias can be located underneath IC dies for one or both of the switch control circuit 308 and the cryptographic processing circuit 316.

Figure 4:
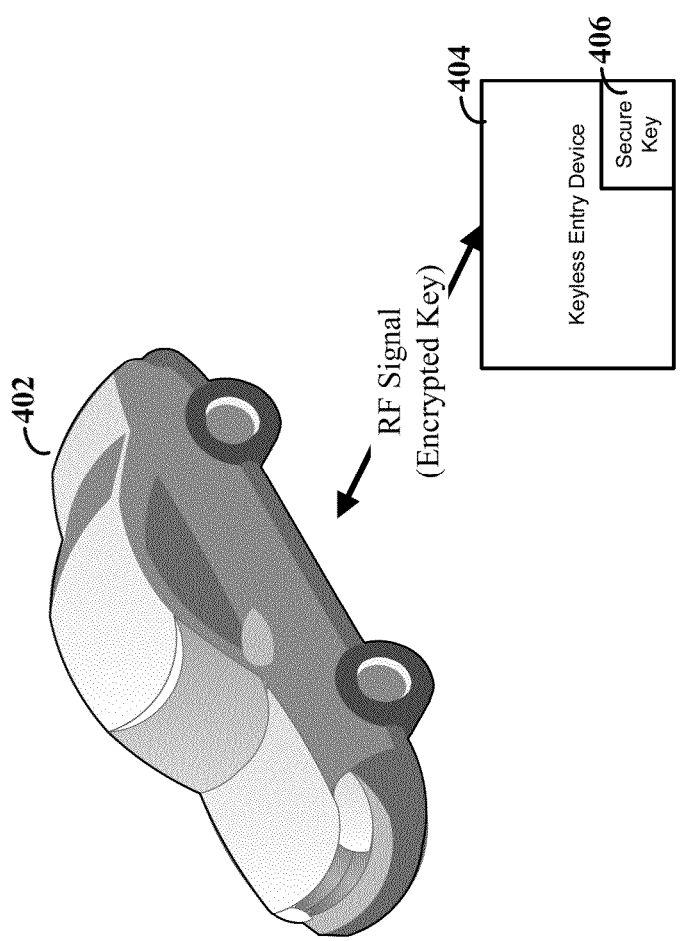
FIG. 4 depicts a passive-keyless entry (PKE) system for use with automotive applications, consistent with embodiments of the present disclosure.

FIG. 4 depicts a passive-keyless entry (PKE) system for use with automotive applications, consistent with embodiments of the present disclosure. The PKE system can be configured to perform various functions, such as opening a door or trunk hatch and/or allowing the driver to start and stop the car with the push of a button. PKE device (e.g., a key-fob) 404 can contain a secure key 406. Automobile 402 can include a security circuit that interrogates PKE device 404 to verify that PKE device 404 is the correct key. PKE device 404 can provide verification by performing a cryptographic function using secure key 406.

Consistent with certain embodiments, PKE device 404 can be powered by a battery during normal operation. PKE device 404 can also use power received over RF signals to power the device. In certain embodiments, the RF signals can be used as a backup power source (e.g., when the battery is depleted). In this manner, the PKE device 404 may have an increased operating range when the battery is powered, but still function, at a reduced range, when the battery is drained.

Certain embodiments of the present disclosure are directed toward the use of multiple power storage elements. For instance, two or more capacitors can be used to power the cryptographic processing circuit. In more particular embodiments, one of the multiple capacitors can be charged while the other powers the cryptographic processing circuit. This can be accomplished, for example, but adding additional switches to allow for selective connection of each capacitor to an external power source and the cryptographic processing circuit. In this manner, the power drawn from the external power source is still not directly from the cryptographic processing circuit, but the external power source can be used to charge one or more of the capacitors that are not currently being used to power the cryptographic processing circuit. Switching control circuitry can automatically switch the capacitor providing power to the cryptographic processing circuit in response to detecting the voltage level going below a threshold level, or after a certain time period. This can be particularly useful for reducing the size of the capacitor(s) required to power the cryptographic processing circuit.

Various modules may be implemented to carry out one or more of the operations and activities described herein and/or shown in the Figures. In these contexts, a "module" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in the Figures. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For instance, the power storage element can include multiple capacitors arranged in parallel. Moreover, combinations of one or more embodiments are also contemplated. Such modifications do not depart from the true spirit and scope of various aspects of the disclosure, including aspects set forth in the claims.

What is claimed is:

1. A device comprising:
an integrated circuit die having
a cryptographic processing circuit configured and arranged to execute a cryptographic algorithm that causes a detectable change in power consumption by the cryptographic processing circuit;
a power storage circuit configured and arranged to store power sufficient for the cryptographic processing circuit to execute the cryptographic algorithm; and
an encapsulation structure that encapsulates the cryptographic processing circuit and the power storage circuit and that is configured and arranged to prevent physical tampering therewith;
a control circuit configured and arranged to
charge the power storage circuit by providing power from an external power source; and
disable, in response to the cryptographic processing circuit executing the cryptographic algorithm, the charging of the power storage circuit using the power from the external power source;
a substrate having one or more electrical traces configured and located in an intermediate layer of the substrate and to provide power from the control circuit to the integrated circuit die; and
an inductive coil configured and arranged to receive power from received radio frequency (RF) signals and to at least mitigate detection of electromagnetic field changes caused by power consumption from the cryptographic processing circuit.

2. The device of claim 1, further including a printed circuit board having the one or more electrical traces configured and arranged to provide power from the control circuit to the integrated circuit die.

3. The device of claim 1, wherein the electrical traces are configured and routed underneath the inductive coil to inhibit detection of electromagnetic field changes caused by power consumption from the cryptographic processing circuit.

4. The device of claim 1, wherein the encapsulation structure is configured and arranged to prevent operation of the cryptographic processing circuit in response to physical tampering with the encapsulation structure.

5. The device of claim 1, wherein the power storage circuit includes a capacitive circuit with one or more capacitors, the capacitive circuit having sufficient capacitance to store power sufficient for the cryptographic processing circuit to execute the cryptographic algorithm.

6. The device of claim 1, wherein the cryptographic algorithm is one of DES, triple DES, AES, RSA and ECC.

7. The device of claim 1, further including processing circuitry configured and arranged to use output data from the cryptographic processing circuit to provide a security code to an automobile entry system.

8. The device of claim 1, where the device is an automotive key that further includes a transponder configured and arranged to wirelessly receive power during use of the automotive key.

9. The device of claim 1, where the device is an automotive key configured and arranged to operate as a passive-keyless-entry (PKE) device powered by a battery located on a substrate that supports the integrated circuit die and the control circuit.

10. A method comprising:
executing, using a cryptographic processing circuit that forms part of an integrated circuit die situated on a substrate, a cryptographic algorithm that causes a detectable change in power consumption by the cryptographic processing circuit;
storing, in a power storage circuit that forms another part of the integrated circuit die, power sufficient for the cryptographic processing circuit to execute the cryptographic algorithm;
controlling a switching circuit to
 charge the power storage circuit by providing power from an external power source, and
 disable, in response to the cryptographic processing circuit executing the cryptographic algorithm, the charging of the power storage circuit using the power from the external power source; and
wherein executing the cryptographic algorithm includes providing power signals from the power storage circuit to the cryptographic processing circuit via connected electrical traces and using an inductive coil to at least mitigate detection of electromagnetic field changes caused by power drawn through the traces.

11. The method of claim 10, wherein the step of executing a cryptographic algorithm includes using a private key to encode data.

12. The method of claim 10, wherein the step of charging the power storage circuit includes using the inductive coil to receive power from received RF signals, and using the received power for charging a capacitor located within an encapsulation structure that includes the capacitor and the cryptographic processing circuit.

13. A device comprising:
an integrated circuit die having
 a cryptographic processing circuit configured and arranged to execute a cryptographic algorithm that is subject to side channel attacks that use power consumption of the cryptographic processing circuit;
 a power storage circuit configured and arranged to store power sufficient for the cryptographic processing circuit to execute the cryptographic algorithm;
 an encapsulation structure that encapsulates the cryptographic processing circuit and the power storage circuit and that is configured and arranged to prevent physical tampering therewith;
a first electrical connection port for external connection;
a switching control circuit configured and arranged to
 operate in each of two alternative modes, a first mode charging the power storage circuit using power provided from an external power source and a second mode acting to block the power provided from the external power source and to provide power from the power storage circuit to the cryptographic processing circuit,
 determine a condition prompting execution of the algorithm and in response to the determination, select between the two alternative modes;
an electrical trace configured and arranged to couple power from the power storage circuit to the cryptographic processing circuit in the second mode;
an inductive coil configured and arranged with the electrical trace to at least mitigate detection of electromagnetic field changes caused by power consumption from the cryptographic processing circuit; and
a second electrical connection port for external connection between the switching control circuit and electrical connection port of the integrated circuit die.

14. The device of claim 13, further including one or more electrical connections between the connection ports of the switching control circuit and the integrated circuit die that are susceptible to monitoring of power consumption.

15. The device of claim 14, wherein the one or more electrical connections are part of a substrate upon which the integrated circuit die and the switching circuit are located.

16. A device comprising:
an integrated circuit die having
 a cryptographic processing circuit configured and arranged to execute a cryptographic algorithm that causes a detectable change in power consumption by the cryptographic processing circuit;
 a power storage circuit configured and arranged to store power sufficient for the cryptographic processing circuit to execute the cryptographic algorithm; and
 an encapsulation structure that encapsulates the cryptographic processing circuit and the power storage circuit and that is configured and arranged to prevent physical tampering therewith;
a control circuit configured and arranged to
 charge the power storage circuit by providing power from an external power source; and
 disable, in response to the cryptographic processing circuit executing the cryptographic algorithm, the charging of the power storage circuit using the power from the external power source; and
a circuit-trace support structure having one or more electrical traces configured and arranged to provide power from the control circuit to the integrated circuit die and having an inductive coil configured and arranged to receive power from received radio frequency (RF) signals and to provide the received power to the control circuit, wherein the electrical traces are routed with and relative to the inductive coil and for providing power to the power storage circuit, thereby mitigating detection of electromagnetic field changes caused by power consumption from the cryptographic processing circuit.

* * * * *